United States Patent
Bax et al.

(10) Patent No.: US 11,184,575 B2
(45) Date of Patent: *Nov. 23, 2021

(54) DISPLAYING REAL-TIME VIDEO OF OBSTRUCTED VIEWS

(71) Applicant: VERIZON PATENT AND LICENSING INC., Basking Ridge, NJ (US)

(72) Inventors: Eric Theodore Bax, Sierra Madre, CA (US); Kimberly Williams, Burbank, CA (US); Lisa Giaffo, Pasadena, CA (US); John Donald, Los Angeles, CA (US); Tanisha Sharma, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,437

(22) Filed: Apr. 21, 2020

(65) Prior Publication Data

US 2020/0252573 A1 Aug. 6, 2020

Related U.S. Application Data

(63) Continuation of application No. 16/051,847, filed on Aug. 1, 2018, now Pat. No. 10,630,931.

(51) Int. Cl.
*H04N 7/18* (2006.01)
*H04N 5/445* (2011.01)

(52) U.S. Cl.
CPC .......... *H04N 5/44504* (2013.01); *H04N 7/18* (2013.01)

(58) Field of Classification Search
CPC ...... H04N 7/18; H04N 5/44504; H04N 5/232; H04N 5/23229
USPC ........................................ 348/148, 143, 159
See application file for complete search history.

(56) References Cited

U.S. PATENT DOCUMENTS

| | | | |
|---|---|---|---|
| 7,688,224 B2 * | 3/2010 | Teffer | G08G 1/01 340/910 |
| 2007/0276600 A1 * | 11/2007 | King | G08G 1/166 701/301 |

* cited by examiner

*Primary Examiner* — Trang U Tran

(57) ABSTRACT

One or more devices, systems, and/or methods for presenting real-time videos of views that are obstructed are provided. For example, a first video may be received from a first camera. The first video comprises a real-time representation of a view opposing a first side of an obstruction. The first video is processed using a set of video parameters to generate a second video. The second video is transmitted to a display device. The second video is displayed on a display area positioned on a second side of the obstruction. A third video, comprising a real-time representation of the display area, is received. The set of video parameters are modified to generate a modified set of video parameters, based upon a comparison of the third video with the first video. The first video is processed using the modified set of parameters to generate an updated instance of the second video.

20 Claims, 13 Drawing Sheets

DISPLAYING REAL-TIME VIDEO OF OBSTRUCTED VIEWS

RELATED APPLICATION

This application claims priority to and is a continuation of U.S. application Ser. No. 16/051,847, filed on Aug. 1, 2018, entitled "DISPLAYING REAL-TIME VIDEO OF OBSTRUCTED VIEWS", which is incorporated by reference herein in its entirety.

BACKGROUND

It is common for drivers, pilots, pedestrians, passengers (e.g., of public transportation systems), etc. to encounter obstructions of views. For example, a driver may drive on a first road and reach an intersection of the first road and a second road. The driver may attempt to determine driving conditions of the second road and/or whether it is safe to cross the intersection. However, an obstruction (e.g., a concrete column supporting a freeway, a building, a wall, etc.) may prevent the driver from being able to see a part of the second road. Thus, in order to determine the driving conditions of the second road (e.g., whether one or more cars are approaching the intersection, whether one or more pedestrians are within, near and/or approaching the intersection, etc.), the driver may have to drive further into the intersection, which may put the driver and/or other drivers/pedestrians at risk of a car accident.

SUMMARY

In accordance with the present disclosure, one or more computing devices and/or methods for presenting real-time videos of views that are obstructed are provided. In an example, a first real-time video that is continuously transmitted by a first camera may be received. The first real-time video may comprise a real-time representation of a view opposing a first side of an obstruction. The first real-time video may be processed using a set of video parameters to generate a second real-time video. The second real-time video may be transmitted to a display device. The second real-time video may be continuously displayed on a display area associated with the display device. The display area may be positioned on a second side of the obstruction. The second real-time video may present real-time driving conditions corresponding to the view opposing the first side of the obstruction. A third real-time video may be received from a first device. The third real-time video may be continuously transmitted by the first device. The third real-time video may comprise a real-time representation of the display area. The set of video parameters may be modified to generate a modified set of video parameters based upon a comparison of the third real-time video with the first real-time video. The first real-time video may be processed using the modified set of video parameters to generate an updated instance of the second real-time video.

In an example, a first real-time video that is continuously transmitted by a first camera may be received. The first real-time video may comprise a real-time representation of a view opposing a first side of an obstruction. The first real-time video may be processed using a set of video parameters to generate a second real-time video. The second real-time video may be transmitted to a display device. The second real-time video may be continuously displayed on a display area associated with the display device. The display area may be positioned on a second side of the obstruction. The second real-time video may present real-time driving conditions corresponding to the view opposing the first side of the obstruction. One or more inputs associated with the second real-time video may be received. The set of video parameters may be modified to generate a modified set of video parameters based upon the one or more inputs. The first real-time video may be processed using the modified set of video parameters to generate an updated instance of the second real-time video.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
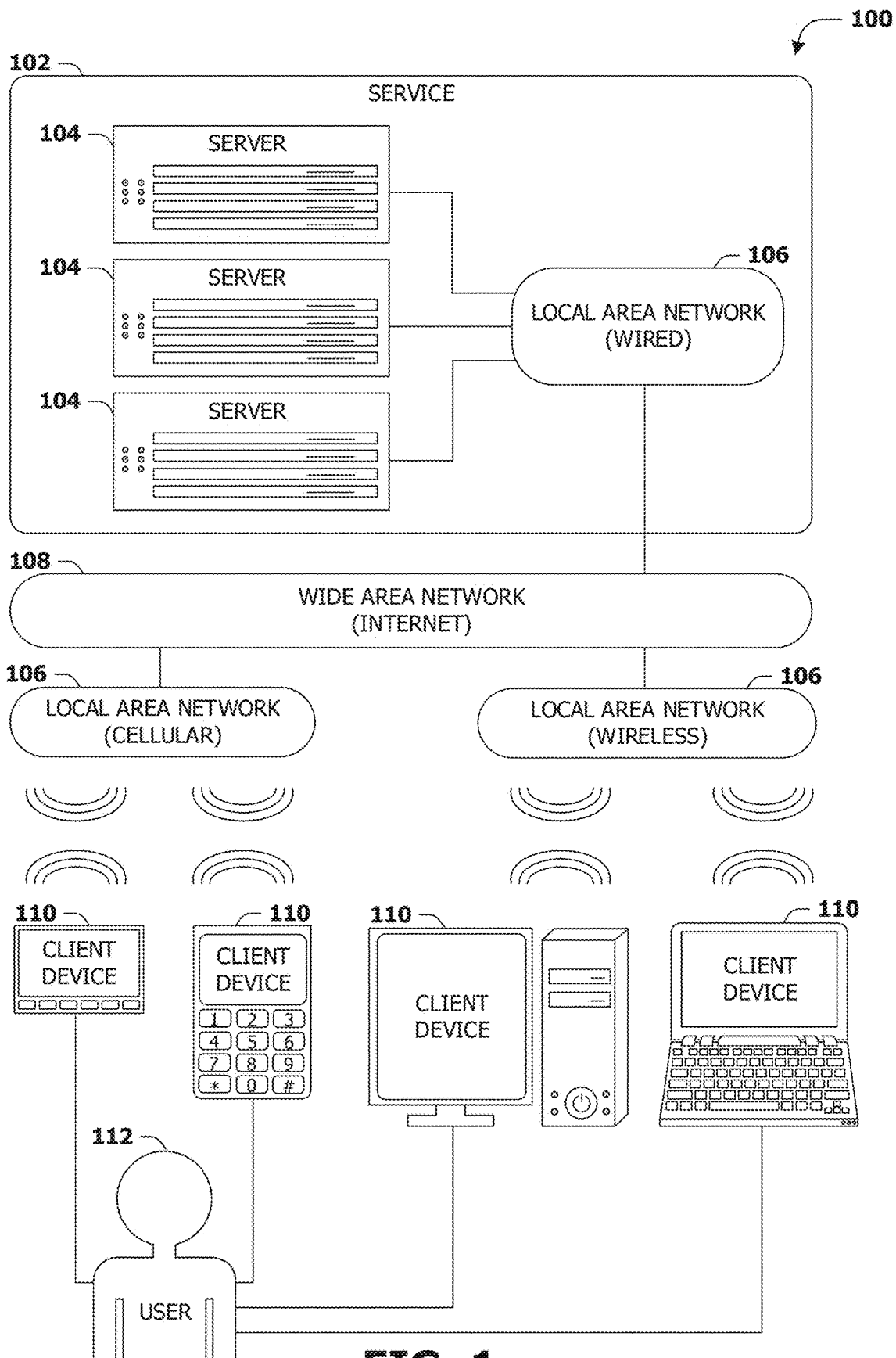
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
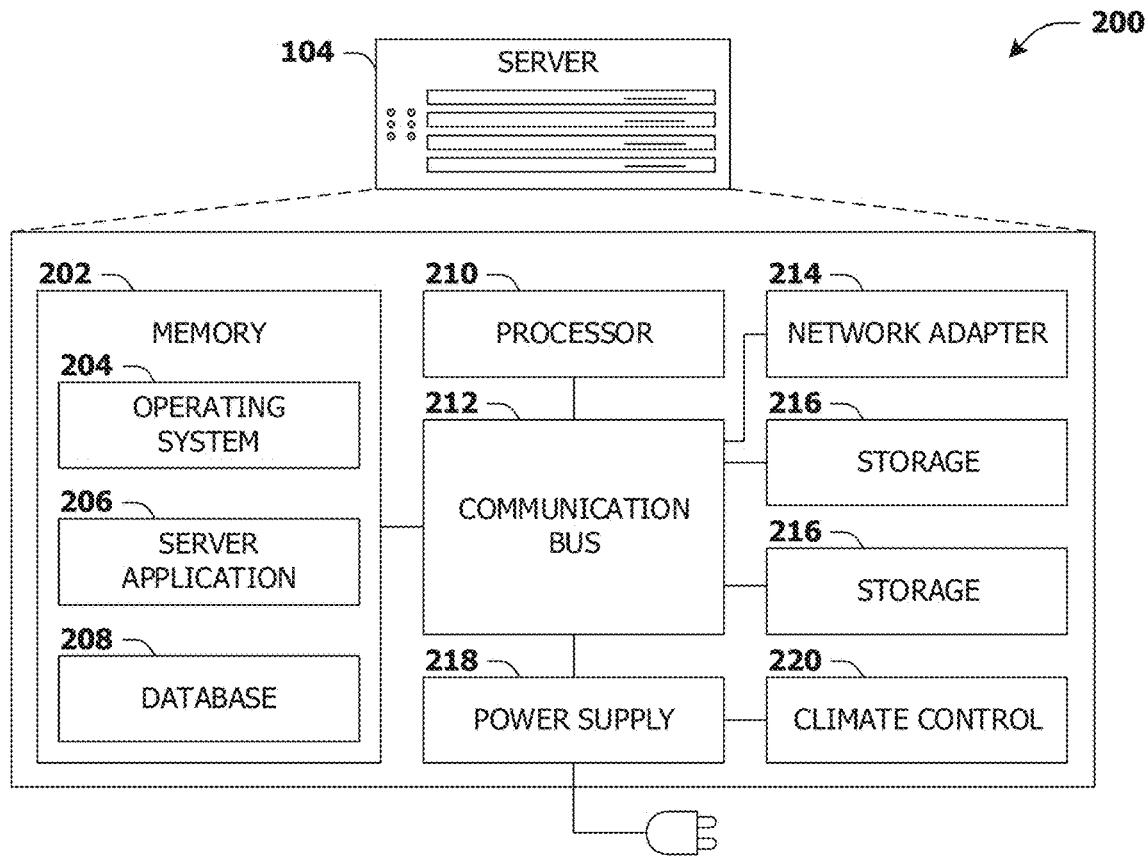
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
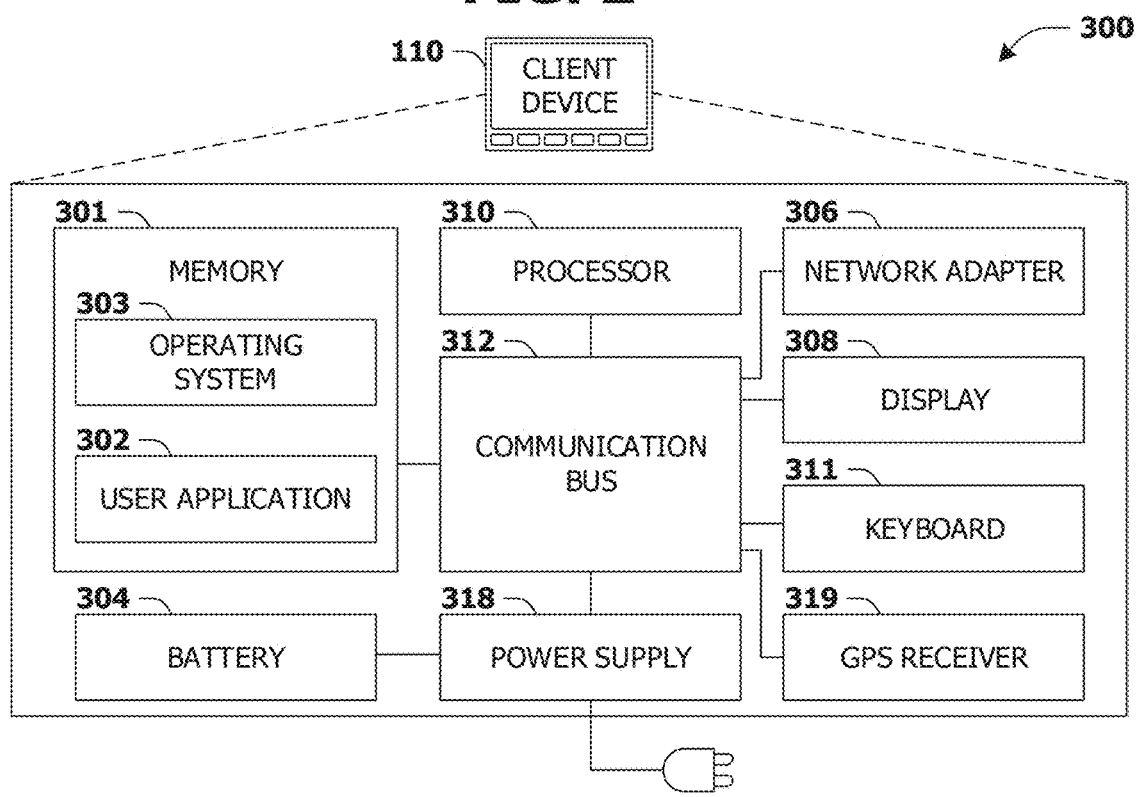
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting real-time videos of views that are obstructed are provided. For example, a driver may drive (e.g., a vehicle, such as a car) on a first road and reach an intersection of the first road and a second road. The driver may attempt to determine driving conditions of the second road and/or whether it is safe to cross the intersection and/or turn (e.g., left or right) into the second road. However, an (e.g., opaque) obstruction (e.g., a column supporting a freeway, a building, a wall, etc.) may prevent the driver from being able to see a part of the second road. Thus, in order to determine the driving conditions of the second road (e.g., whether one or more vehicles are approaching the intersection, whether one or more pedestrians are within, near and/or approaching the intersection, etc.), the driver may need to drive further into the intersection, which may put the driver and/or other drivers/pedestrians at risk of a car accident.

Thus, in accordance with one or more of the techniques presented herein, a first camera may continuously transmit a first real-time video, comprising a real-time representation of a second view opposing a first side of the obstruction. In some examples, the first real-time video may comprise a real-time representation of the part of the second road (e.g., that is blocked by the obstruction). The first real-time video may be processed (e.g., using one or more image processing techniques and/or one or more video processing techniques), using a set of video parameters, to generate a second real-time video. The second real-time video may be continuously displayed on a display area. The display area may be connected to the obstruction, positioned adjacent to the obstruction and/or positioned within the vehicle of the driver. In some examples, the second real-time video being continuously displayed on the display area may assist the driver in determining the driving conditions of the second road.

In some examples, a first device may continuously transmit a third real-time video, comprising a real-time representation of the display area. The set of video parameters may be modified to generate a modified set of video parameters based upon a comparison of the third real-time video with the first real-time video. The first real-time video may be processed using the modified set of video parameters to generate an updated instance of the second real-time video. For example, the updated instance of the second real-time video (e.g., generated using the modified set of video parameters) may be more similar to the first real-time video than a previous instance of the second real-time video (e.g., generated using the set of video parameters). Alternatively and/or additionally, the updated instance of the second real-time video may present driving conditions of the part of the second road more clearly than the previous instance of the second real-time video.

Figure 4:
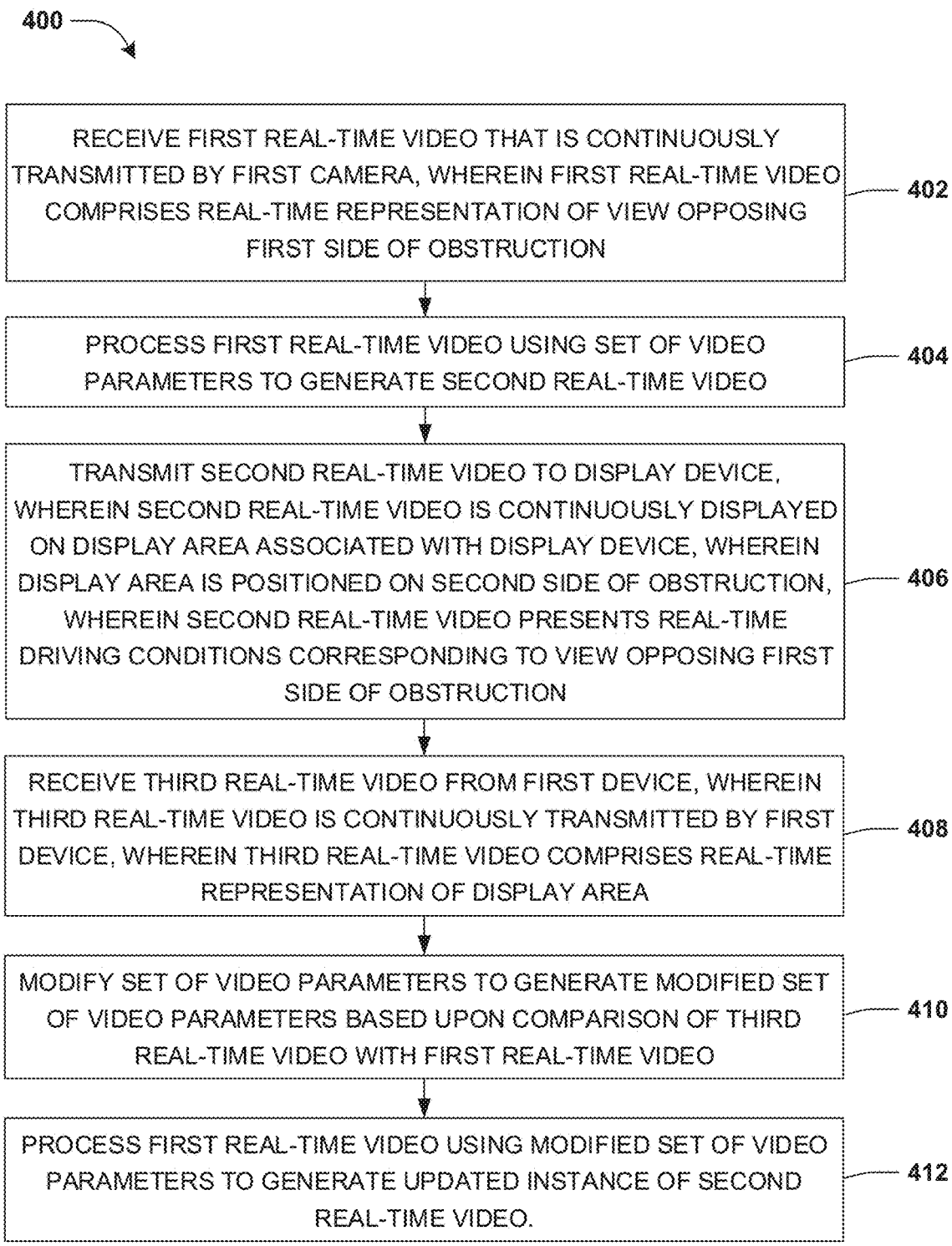
FIG. 4 is a flow chart illustrating an example method for presenting real-time videos of views that are obstructed.

An embodiment of presenting real-time videos of views that are obstructed is illustrated by an example method 400 of FIG. 4. At 402, a first real-time video may be received. In some examples, the first real-time video may be received by a server and/or a computing device. In some examples, the first real-time video may be continuously transmitted by a first camera (e.g., and/or a communication module connected to the first camera). For example, the first real-time video may comprise a real-time representation of a first view opposing a first side of an obstruction. For example, the first camera may face a direction of the first view and/or the first camera may continuously record the first real-time video.

At 404, the first real-time video may be processed using a set of video parameters to generate a second real-time video. For example, the first real-time video may be processed using one or more image processing techniques and/or one or more video processing techniques. For example, the set of video parameters may comprise one or more contrast parameters (e.g., corresponding to a contrast of the second real-time video), one or more brightness parameters (e.g., corresponding to a brightness of the second real-time video), one or more focus parameters (e.g., corresponding to a focus of the second real-time video), one or more edge definition parameters (e.g., corresponding to an edge definition of the second real-time video), one or more color parameters (e.g., corresponding to one or more colors of the second real-time video) and/or one or more other types of video parameters.

At 406, the second real-time video may be transmitted to a display device. The second real-time video may be continuously displayed on a display area associated with the display device. The display area may be positioned on a second side of the obstruction. In some examples, the second real-time video may present real-time driving conditions corresponding to the first view. Alternatively and/or additionally, the second real-time video may not present real-time driving conditions corresponding to the first view. For example, the second real-time video may present scenery, activity, aerial footage, security camera footage, etc. of the first view. In some examples, the first real-time video may be processed to generate the second real-time video using the server, the computing device, a mapping device and/or an optical instrument associated with the mapping device. For example, the first real-time video may be processed to generate the second real-time video based upon the display device and/or characteristics (e.g., size, shape, etc.) of the display area.

In some examples, the display area may be connected to the obstruction. Alternatively and/or additionally, the display area may be positioned adjacent to the obstruction. Alternatively and/or additionally, the display area may be inside of a vehicle (e.g., a car, a bus, a truck, an aircraft, a watercraft, etc.). For example, the communication module (connected to the first camera) and/or a second communication module may be detected by a third communication module comprised within the vehicle. Responsive to detecting the communication module and/or the second communication module, the third communication module may transmit a request to access the second real-time video. Alternatively and/or additionally, the third communication module may be detected by the communication module and/or the second communication module. Responsive to detecting the third communication module, the communication module and/or the second communication module may transmit the second real-time video and/or a request to transmit the second real-time video.

In some examples, the display device and/or the display area may be comprised within a screen (e.g., a TV, a monitor, etc.). For example, the screen may be mounted onto the obstruction. Alternatively and/or additionally, the screen may be mounted on a fixture positioned in an area of the second side of the obstruction (e.g., within two feet of the obstruction, within ten feet of the obstruction, within 30 feet of the obstruction, etc.). Alternatively and/or additionally, the screen may be positioned inside of the vehicle. For example, the screen may be positioned adjacent to (e.g., in front of) a windshield, a window, a dashboard, a steering wheel, etc. of the vehicle. For example, the screen may comprise a head-up display (HUD) comprising a transparent display. For example, the HUD may be positioned adjacent to (e.g., in front of) a windshield, a window, a dashboard, a steering wheel, etc. of the vehicle. Alternatively and/or additionally, the screen may be comprised within a multimedia device and/or a navigation system of the vehicle.

Alternatively and/or additionally, the display device may comprise a projector (e.g., an image projector, a video projector, etc.) configured to project images onto the display area. For example, the display area may comprise a section of the obstruction and/or the display device may project the second real-time video onto the section of the obstruction.

Alternatively and/or additionally, the display area may comprise a projection screen. For example, the projection screen may be mounted onto the obstruction. Alternatively and/or additionally, the projection screen may be mounted on a fixture positioned in an area of the second side of the obstruction (e.g., within two feet of the obstruction, within ten feet of the obstruction, within 30 feet of the obstruction, etc.). Alternatively and/or additionally, the display area may comprise a section of an interior of the vehicle. For example, the display device may project the second real-time video onto a windshield of the vehicle, a window of the vehicle, a pillar of the vehicle and/or a dashboard of the vehicle.

At 408, a third real-time video may be received from a first device (e.g., using the server and/or the computing device). For example, the third real-time video may be continuously transmitted by the first device. The third real-time video may comprise a real-time representation of (e.g., the second real-time video being displayed on) the display area. For example, the first device may comprise a second camera facing a direction of the display area. The third real-time video may be recorded by the second camera. The third real-time video may be continuously transmitted by the second camera (e.g., and/or a communication module connected to the second camera).

Alternatively and/or additionally, the first device may be a computer. The third real-time video may be generated by the computer. For example, the third real-time video may be an electronic representation of (e.g., the second real-time video being displayed on) the display area. Alternatively and/or additionally, the third real-time video may be generated based upon one or more display area parameters. For example, the third real-time video may be generated based upon a time of day, a type of surface associated with the display area, a type of screen, etc.

Alternatively and/or additionally, the third real-time video may be generated based upon one or more sensor inputs from one or more sensors. For example, the one or more sensor inputs may comprise one or more indications of one or more weather conditions associated with the display area, one or more indications of one or more lighting conditions associated with the display area, etc. In some examples, when the weather conditions are determined to be foggy and/or the lighting conditions are determined to be dim, the third real-time video may be representative of fogginess and/or dim lighting, while when the weather conditions are determined to be clear and/or the lighting conditions are determined to be bright, the third real-time video may be representative of a clear day and/or bright lighting.

At 410, the set of video parameters may be modified to generate a modified set of video parameters based upon a comparison of the third real-time video with the first real-time video. In some examples, the set of video parameters may be modified to generate the modified set of video parameters using the server, the computing device and/or a tuning device associated with the server. For example, the third real-time video may be compared with the first real-time video to generate a set of differences. In some examples, merely a first frame of the third real-time video may be compared with a second frame of the first real-time video to generate the set of differences. In some examples, the first frame of the third real-time video and the second frame of the first real-time video may correspond to a first time. Alternatively and/or additionally, merely a first video clip of the third real-time video may be compared with a second video clip of the first real-time video to generate the set of differences.

In some examples, the set of differences may comprise a first difference in contrast between the first real-time video and the third real-time video. Alternatively and/or additionally, the set of differences may comprise a second difference in brightness between the first real-time video and the third real-time video. Alternatively and/or additionally, the set of differences may comprise a third difference in focus between the first real-time video and the third real-time video. Alternatively and/or additionally, the set of differences may comprise a fourth difference in edge definition between the first real-time video and the third real-time video.

In some examples, the set of video parameters may be modified to generate the modified set of video parameters based upon the set of differences. For example, the set of video parameters may be modified in order to reduce a difference level between the first real-time video and the third real-time video. For example, responsive to determining that the first difference in contrast between the first real-time video and the third real-time video is greater than a first difference threshold, the one or more contrast parameters of the set of video parameters may be adjusted (e.g., in order to reduce the first difference). Alternatively and/or additionally, responsive to determining that the second difference in brightness between the first real-time video and the third real-time video is greater than a second difference threshold, the one or more brightness parameters of the set of video parameters may be adjusted (e.g., in order to reduce the second difference). Alternatively and/or additionally, responsive to determining that the third difference in focus between the first real-time video and the third real-time video is greater than a third difference threshold, the one or more focus parameters of the set of video parameters may be adjusted (e.g., in order to reduce the third difference). Alternatively and/or additionally, responsive to determining that the fourth difference in edge definition between the first real-time video and the third real-time video is greater than a fourth difference threshold, the one or more edge definition parameters of the set of video parameters may be adjusted (e.g., in order to reduce the fourth difference).

In some examples, the modifying the set of video parameters may comprise modifying the set of video parameters a plurality of instances, using machine learning techniques, until a level of closeness between one or more parameters of the third real-time video and one or more parameters of the first real-time video is greater than a closeness threshold. For example, responsive to each instance of the plurality of instances of the modifying the set of video parameters, a level of closeness between the one or more parameters of the third real-time video and the one or more parameters of the first real-time video may be determined. Responsive to determining that the level of closeness between the one or more parameters of the third real-time video and the one or more parameters of the first real-time video is less than the closeness threshold, the set of video parameters may (further) be modified using machine learning techniques. Alternatively and/or additionally, responsive to determining that the level of closeness between the one or more parameters of the third real-time video and the first real-time video is greater than the closeness threshold, the modified set of video parameters may be saved for further use (e.g., in processing the first real-time video to generate the second real-time video).

In some examples, the modifying the set of video parameters may be performed in order to improve clarity and/or usefulness of the second real-time video. Alternatively and/or additionally, the modifying the set of video parameters may be performed in order to improve accuracy and/or bandwidth efficiency of the second real-time video. For example, the set of video parameters may be adjusted such that a clarity level of driving conditions, scenery, activity, aerial footage and/or security camera footage of the second real-time video is greater than a clarity threshold. The clarity level of the second real-time video may be a measure of how well an observer of the display area can understand content of the second real-time video, distinguish between objects of the second real-time video, etc. In an example, the one or more edge definition parameters may be adjusted such that the edge definition of the second real-time video enables the observer to distinguish between objects of the second real-time video. In a second example, one or more parameters may be adjusted in order to reduce shadows in the second real-time video. In a third example, a position of the first camera and/or the direction that the first camera faces may be adjusted to increase the clarity level of driving conditions, scenery, activity, aerial footage and/or security camera footage of the second real-time video.

In some examples, an autonomous vehicle (e.g., a driverless car) may be detected (e.g., by the communication module and/or the second communication module). For example, responsive to detecting the autonomous vehicle, the set of video parameters may be modified in order to improve accuracy, usefulness and/or bandwidth efficiency of the second real-time video for the autonomous vehicle. In some examples, the second real-time video may be used (e.g., by the autonomous vehicle) to determine driving conditions associated with the second real-time video. In some examples, the second real-time video provided to the autonomous vehicle may differ from real-time video provided for a vehicle that is not determined to be autonomous (e.g., wherein the real-time video is provided to the display area and/or the vehicle). For example, the second real-time video may be optimized for autonomous vehicles, while the real-time video may be optimized for non-autonomous vehicles.

In some examples, the set of parameters may be modified (e.g., using machine learning techniques) periodically (e.g., once per hour, once per 30 minutes, once per day, three times per day, etc.). Alternatively and/or additionally, the set of parameters may be modified (e.g., using machine learning techniques) responsive to determining a change in conditions of the display area, the first camera and/or the second camera (e.g., determining a change in lighting conditions, determining a change in time of day, determining a change in weather conditions such as precipitation levels, smog levels and/or other weather conditions, etc.).

In some examples, a graphical user interface of a second device may be controlled to display a video rating interface. In some examples, the second device may be the display device. For example, the video rating interface may be displayed using the display area. Alternatively and/or additionally, the second device may be a client device of a user (e.g., a smartphone, a tablet, a laptop, a computer, etc.). For example, the graphical user interface of the second device may be controlled via a network connection.

In some examples, a representation of a segment of the second real-time video (e.g., generated based upon the set of video parameters) may be displayed using the video rating interface. For example, the segment of the second real-time video may comprise a frame of the second real-time video. Alternatively and/or additionally, the segment of the second real-time video may comprise a video clip (e.g., 3 seconds, 10 seconds, 30 seconds, etc.) of the second real-time video. In some examples, one or more selectable inputs may be displayed, using the video rating interface.

In some examples, the one or more selectable inputs may correspond to a rating of the segment of the second real-time video. For example, the video rating interface may display instructions for selecting, using the one or more selectable inputs, a rating of the second real-time video. For example, the rating may correspond to clarity of driving conditions, scenery, activity, aerial footage and/or security camera footage presented by the segment of the second real-time video. Alternatively and/or additionally, the rating may correspond to a usefulness of the second real-time video for the user. For example, the one or more selectable inputs may comprise a first selectable input corresponding to a positive rating (e.g., "Satisfactory", "Good", etc.) and/or a second selectable input corresponding to a negative rating (e.g., "Unsatisfactory", "Bad", etc.). Alternatively and/or additionally, the one or more selectable inputs may comprise a set of selectable inputs. A level of quality (e.g., of clarity and/or usefulness) of the segment of the second real-time video may be selected using the set of selectable inputs.

Alternatively and/or additionally, the one or more selectable inputs may comprise a second set of selectable inputs corresponding to the contrast of the second real-time video. For example, a second rating corresponding to the contrast of the second real-time video may be selected using the second set of selectable inputs. Alternatively and/or additionally, the one or more selectable inputs may comprise a third set of selectable inputs corresponding to the brightness of the second real-time video. For example, a third rating corresponding to the brightness of the second real-time video may be selected using the third set of selectable inputs.

Alternatively and/or additionally, the one or more selectable inputs may comprise a fourth set of selectable inputs corresponding to the focus of the second real-time video. For example, a fourth rating corresponding to the focus of the second real-time video may be selected using the fourth set of selectable inputs. Alternatively and/or additionally, the one or more selectable inputs may comprise a fifth set of selectable inputs corresponding to the edge definition of the second real-time video. For example, a fifth rating corresponding to the edge definition of the second real-time video may be selected using the fifth set of selectable inputs. Alternatively and/or additionally, the one or more selectable inputs may comprise a sixth set of selectable inputs corresponding to the one or more colors of the second real-time video. For example, a sixth rating corresponding to the one or more colors may be selected using the sixth set of selectable inputs.

In some examples, the video rating interface may display a representation of a list of options. For example, the list of options may comprise a plurality of segments of the second real-time video. Each option of the list of options may comprise a segment of the plurality of segments. In some examples, the plurality of segments may be generated using a plurality of sets of video parameters. Alternatively and/or additionally, the plurality of segments may be generated based upon a (common) portion (e.g., a video clip and/or a frame) of the first real-time video. For example, each segment of the plurality of segments may be generated using a set of video parameters of the plurality of sets of video parameters. In some examples, the sets of video parameters of the plurality of sets of video parameters are different than each other (e.g., each set of video parameters of the plurality of sets of video parameters is unique). In some examples, the one or more selectable inputs may comprise a seventh set of selectable inputs. For example, each selectable input of the seventh set of selectable inputs may correspond to a segment of the plurality of segments.

In some examples, the video rating interface may comprise instructions for selecting one or more options of the list of options corresponding to one or more segments of the plurality of segments that are clear and/or useful for the user. In some examples, the one or more options, corresponding to the one or more segments of the plurality of segments, may be selected from the list of options, using the seventh set of selectable inputs.

In some examples, responsive to receiving selections of the one or more options, a second list of options may be generated based upon the one or more options. The second list of options may comprise a second plurality of segments of the second real-time video. For example, the second plurality of segments may be generated using a second plurality of sets of video parameters. In some examples, the second plurality of sets of video parameters may be generated based upon one or more sets of video parameters corresponding to the one or more segments (e.g., and/or the one or more options) selected from the list of options. For example, the video rating interface may display a representation of the second list of options. One or more second options (e.g., that are clear and/or useful for the user) may be selected from the second list of options using an eighth set of selectable inputs of the one or more selectable inputs.

In some examples, one or more inputs associated with the second real-time video may be received. For example, the one or more inputs may comprise one or more selections of the one or more selectable inputs. In some examples, rather than modifying the set of video parameters to generate the modified set of video parameters based upon the comparison of the third real-time video with the first real-time video, the modifying the set of video parameters to generate the modified set of video parameters may be performed based upon the one or more inputs. For example, the third real-time video may not be received and/or may not be compared with the first real-time video.

Alternatively and/or additionally, rather than modifying the set of video parameters to generate the modified set of video parameters based upon the one or more inputs, the modifying the set of video parameters to generate the modified set of video parameters may be performed based upon the comparison of the third real-time video with the first real-time video. For example, the graphical user interface of the second device may not be controlled to display the video rating interface and/or the one or more inputs may not be received. Alternatively and/or additionally, the modifying the set of video parameters to generate the modified set of video parameters may be performed based upon the one or more inputs and the comparison of the third real-time video with the first real-time video.

At 412, the first real-time video may be processed using the modified set of video parameters to generate an updated instance of the second real-time video. The first real-time video may be processed using one or more image processing techniques and/or one or more video processing techniques. In some examples, the second real-time video (e.g., the updated instance of the second real-time video) may be transmitted to the display device. For example, the second real-time video (e.g., the updated instance of the second real-time video) may be continuously displayed on the display area.

In some examples, the second real-time video may comprise representations of heat emanated by objects comprised within the second real-time video. For example, one or more indications of the heat may be received from one or more heat sensors (e.g., and/or one or more infrared sensors). Alternatively and/or additionally, the first real-time video may be analyzed (e.g., digitally analyzed) (e.g., using one or more image processing techniques and/or one or more video processing techniques) to determine types of objects of the objects (e.g., determine one or more objects that are pedestrians, one or more objects that are vehicles, etc.) and/or generate the representations of heat based upon the types of objects. For example, a temperature may be assigned to an object based upon a type of object associated with the object.

In some examples, one or more image processing techniques and/or one or more video processing techniques may be performed to display the representations of the heat emanated by the objects (e.g., one or more vehicles, one or more pedestrians, one or more animals, etc.) using one or more colors. In some examples, the representations of heat may comprise one or more temperature colors overlaid onto the objects of the second real-time video based upon temperatures of the objects. For example, a first color of the one or more temperature colors may be assigned to a first range of temperatures, a second color of the one or more temperature colors may be assigned to a second range of temperatures, etc. Accordingly, the first color may be overlaid onto areas of the second real-time video that are determined to correspond to the first range of temperatures, the second color may be overlaid onto areas of the second real-time video that are determined to correspond to the second range of temperatures, etc.

Alternatively and/or additionally, one or more image processing techniques and/or one or more video processing techniques may be performed to display representations of the objects based upon the types of objects, using one or more second colors. In some examples, the representations of the objects may comprise one or more object colors overlaid onto the objects of the second real-time video based upon the types of objects. For example, a first color of the one or more object colors may be assigned to a third type of object (e.g., vehicle), a fourth color of the one or more object colors may be assigned to a second type of object (e.g., pedestrian), a fifth color of the one or more object colors may be assigned to a third type of object (e.g., animal), etc. Accordingly, the third color may be overlaid onto areas of the second real-time video that are determined to correspond to the first type of object, the fourth color may be overlaid onto areas of the second real-time video that are determined to correspond to the second type of object, the fifth color may be overlaid onto areas of the second real-time video that are determined to correspond to the third type of object, etc. Alternatively and/or additionally, one or more image segmentation techniques may be performed such that the objects of the second real-time video are outlined and/or the objects can be distinguished from each other.

In some examples, the second real-time video may comprise representations of object motion of the objects comprised within the second real-time video. For example, the first real-time video may be analyzed (e.g., digitally analyzed) (e.g., using one or more image processing techniques and/or one or more video processing techniques) to determine directions of movement of the objects and/or speeds of the objects. For example, responsive to determining that a first object of the first real-time video is moving at a first speed and/or in a first direction, a first indication of motion (e.g., an arrow, a line, etc.) may be overlaid onto the second real-time video (e.g., overlaid onto areas of the second real-time video associated with the first object). For example, a first length, a sixth color and/or a first thickness of the first indication of motion may be generated based upon a magnitude of the first speed and/or a direction of the first indication of motion may be based upon the first direction.

Alternatively and/or additionally, a risk factor may be determined based upon a type of object of the first object, the first speed and/or the first direction. Responsive to determining that the risk factor is greater than a risk threshold, an indication of risk may be overlaid on the second real-time video (e.g., on an entirety of the second real-time video, on a portion of the second real-time video, on a border of the second real-time video, etc.). Alternatively and/or additionally, responsive to determining that the risk factor is greater than the risk threshold, a risk audio message, generated based upon the type of object of the first object, the first speed and/or the first direction, may be outputted using a speaker.

Alternatively and/or additionally, responsive to determining that the risk factor is less than the risk threshold, an indication of safeness may be overlaid on the second real-time video (e.g., on the entirety of the second real-time video, on a second portion of the second real-time video, on the border of the second real-time video etc.). In some examples, a color of the indication of risk may be different than a color of the indication of safeness (e.g., the indication of risk may be red and/or the indication of safeness may be green). Alternatively and/or additionally, responsive to determining that the risk factor is less than the risk threshold, a safeness audio message may be outputted using the speaker.

Alternatively and/or additionally, the first speed and/or the first direction may be analyzed to determine one or more first directions of movement that are safe to drive/move through and/or one or more second directions of movement that are unsafe to drive/move through. For example, responsive to determining that the one or more first directions of movement are safe to drive/move through, one or more representations (e.g., one or more arrows) of the one or more first directions of movement may be overlaid onto the second real-time video. For example, responsive to determining that a first direction of movement (e.g., turning left at an intersection) is safe, a first representation of the first direction of movement (e.g., a first arrow facing left) may be overlaid onto the second real-time video. Alternatively and/or additionally, responsive to determining that the first direction of movement is safe, an audio message associated with the first direction of movement may be outputted using the speaker (e.g., "Safe to turn left").

Alternatively and/or additionally, responsive to determining that a second direction of movement (e.g., turning right at an intersection) is unsafe, a second representation of the second direction of movement (e.g., a second arrow facing right) may be overlaid onto the second real-time video. In some examples, a color of the first representation may be different than a color of the second representation (e.g., the first arrow may be green and/or the second arrow may be red). Alternatively and/or additionally, responsive to determining that the second direction of movement is unsafe, an audio message associated with the second direction of movement may be outputted using the speaker (e.g., "Unsafe to turn right).

In some examples, one or more markings may be overlaid onto the second real-time video. For example, a first set of markings may be overlaid onto the second real-time video. The first set of markings may comprise a pattern (e.g., a grid, a set of vertical columns, etc.) and/or a representation of a frame bordering the second real-time video such that an observer may understand that it is unsafe to drive/move through the display area. Alternatively and/or additionally, a second set of markings may be overlaid onto the second real-time video. The second set of markings may comprise a representation of a shape (e.g., a shape of a predator animal such as a hawk, an owl, etc., and/or a different shape) such that birds and/or other animals are discouraged from approaching (e.g., and/or crashing into) the display area.

In some examples, the second real-time video may be a three-dimensional video. For example, a first plurality of real-time videos, comprising the first real-time video, may be received from a first set of cameras, comprising the first camera (e.g., and one or more other cameras). In some examples, one or more image processing techniques and/or one or more video processing techniques may be performed on the first plurality of real-time videos to generate the three-dimensional video.

FIGS. 5A-5D illustrates a system 501 for modifying the set of video parameters. In some examples, a driver of a vehicle 510 may drive on a first road and reach an intersection of the first road and a second road. The driver may attempt to determine driving conditions of the second road and/or whether it is safe to cross the intersection and/or turn (e.g., left or right) into the second road. However, a second obstruction 506 may prevent the driver from being able to see a part of the second road. In some examples, the second obstruction 506 may be the obstruction. In some examples, the second obstruction 506 may be a support structure such as a column supporting a freeway, a part of a building, a wall, a tree and/or a different type of obstruction.

Figure 5A:
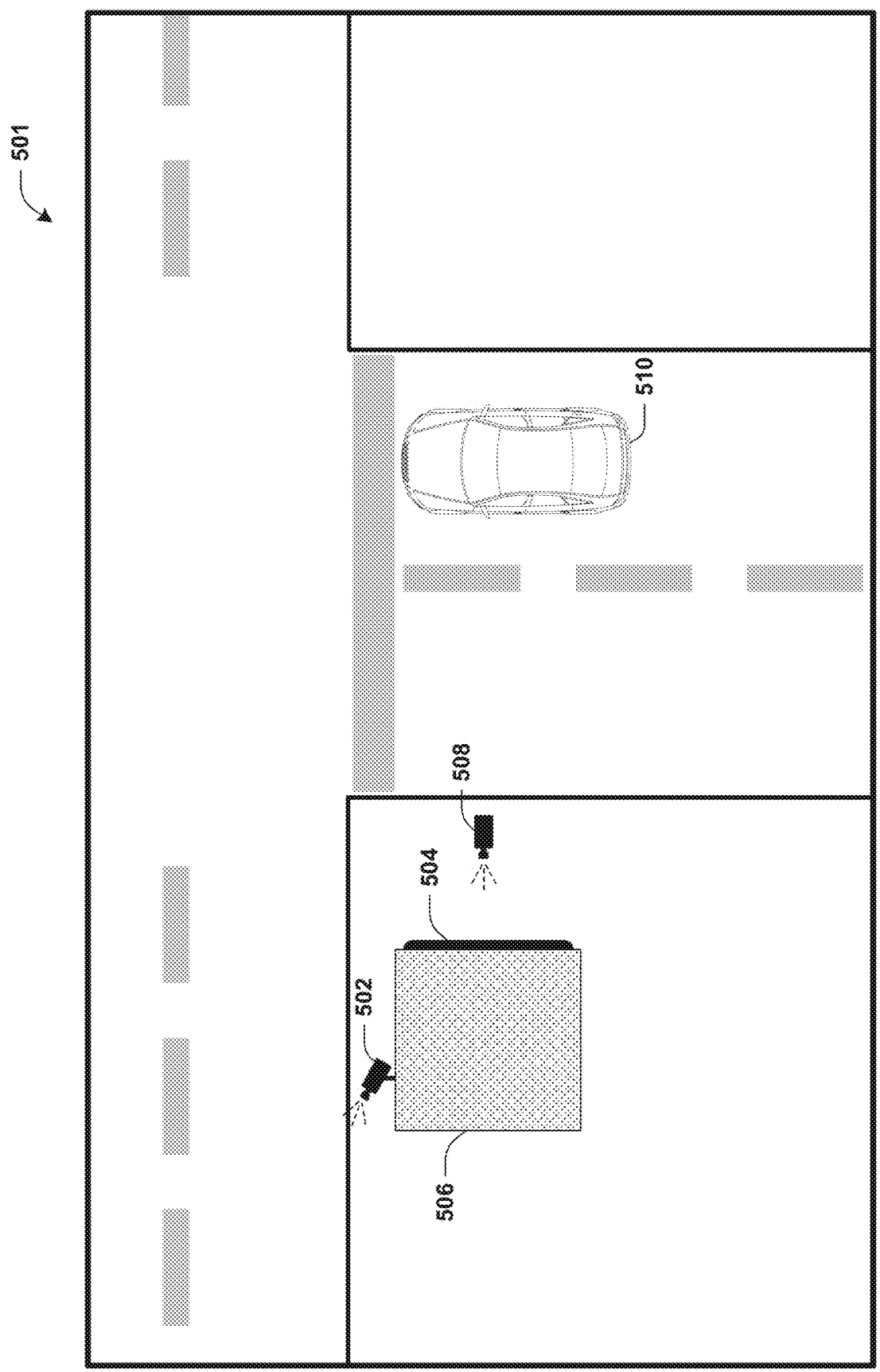
FIG. 5A is a component block diagram illustrating an example system for modifying a set of video parameters, wherein a real-time representation of a part of a second road is displayed using a second display area.

FIG. 5A illustrates the second real-time video, comprising a real-time representation of a part of the second road, being displayed using a second display area 504. The camera 502 may be mounted on the second obstruction 506. For example, the camera 502 may face a direction corresponding to the part of the second road. Accordingly, the first real-time video may comprise a real-time representation of the part of the second road. The first real-time video may be processed using the set of video parameters to generate the second real-time video. For example, the first real-time video may be processed using one or more image processing techniques and/or one or more video processing techniques.

The second real-time video may be transmitted to the second display area 504. In some examples, the second display area 504 may be connected to the second obstruction 506. Alternatively and/or additionally, the second display area 504 may be comprised inside of the vehicle 510. In some examples, the second display area 504 may comprise the display device and/or the display area. For example, the second real-time video may be continuously displayed using the second display area 504. In some examples, the second real-time video may present real-time driving conditions corresponding to the second road.

In some examples, the third real-time video may be received from a camera 508. In some examples, the camera 508 may be the second camera. For example, the third real-time video may comprise a real-time representation of (the second real-time video being displayed on) the second display area 504. For example, the camera 508 may face a direction of the second display area 504.

Figure 5B:
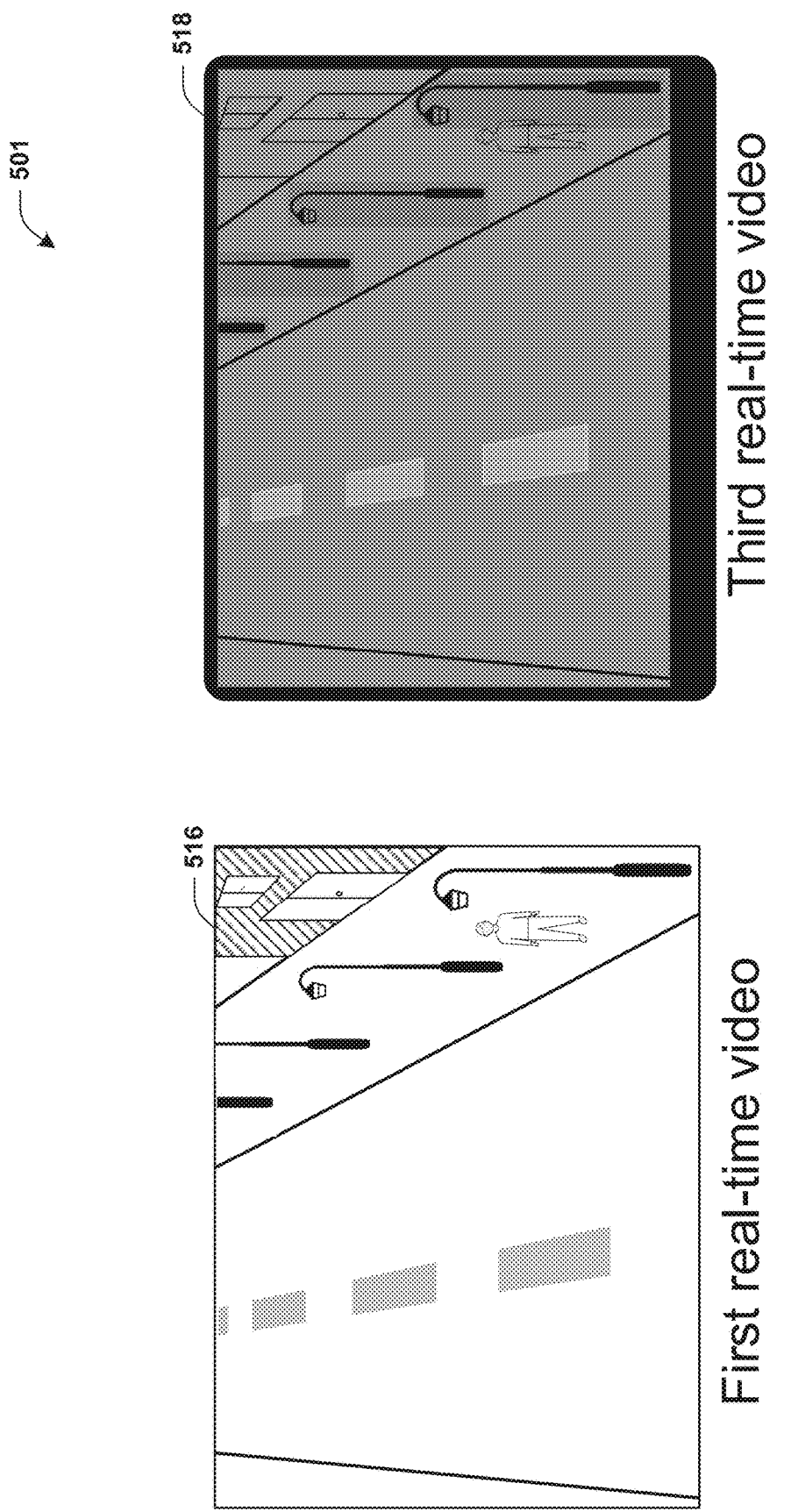
FIG. 5B is a component block diagram illustrating a first instance of a first real-time video and a first instance of a third real-time video associated with an example system for modifying a set of video parameters.

FIG. 5B illustrates a first instance of the first real-time video 516 and/or a first instance of the third real-time video 518. For example, the first instance of the first real-time video 516 may be compared with the first instance of the third real-time video 518 to generate a set of differences. In an example, the set of differences may comprise a fifth difference in brightness between the first instance of the first real-time video 516 and the first instance of the third real-time video 518. In some examples, the set of video parameters may be modified to generate the modified set of video parameters based upon the set of differences (e.g., the fifth difference in brightness). For example, the set of parameters may be modified a plurality of instances, using machine learning techniques, until a level of closeness between one or more parameters of the third real-time video and one or more parameters of the first real-time video is greater than a closeness threshold.

Figure 5C:
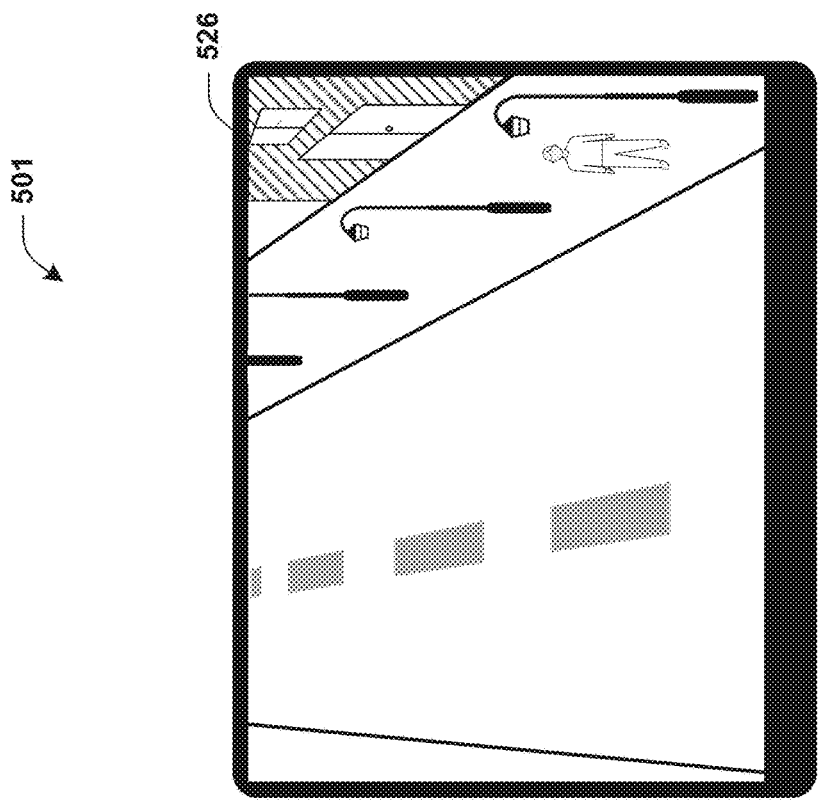
FIG. 5C is a component block diagram illustrating a second instance of a first real-time video and a second instance of a third real-time video associated with an example system for modifying a set of video parameters.
Figure 5C:
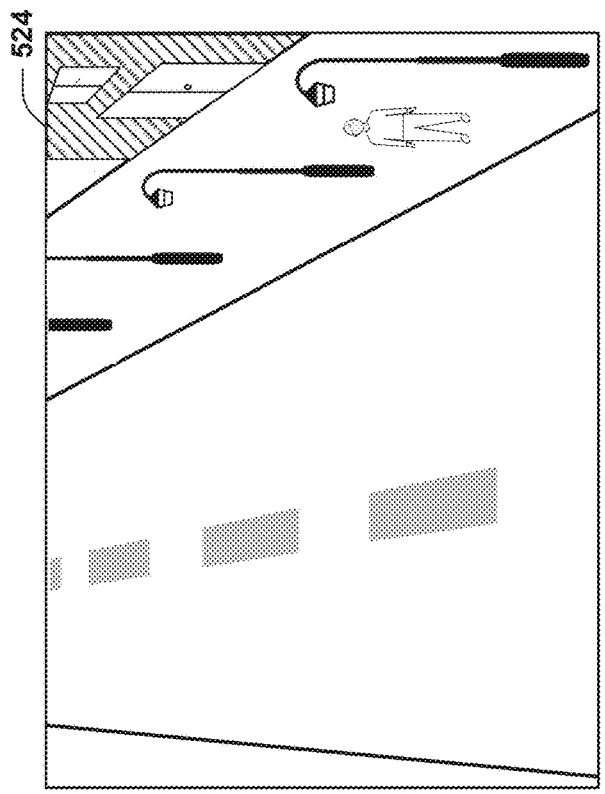

FIG. 5C illustrates a second instance of the first real-time video 524 and/or a second instance of the third real-time video 526. For example, the first real-time video may be processed using the modified set of video parameters to generate a second instance of the second real-time video. For example, the level of closeness between one or more parameters of the second instance of the third real-time video 526 (e.g., corresponding to the second instance of the second real-time video) and one or more parameters of the second instance of the first real-time video 524 may be greater than the closeness threshold.

In some examples, the modified set of video parameters may be modified to generate a second modified set of video parameters in order to improve clarity and/or usefulness of the second real-time video. For example, the modified set of video parameters may be adjusted such that a clarity level of driving conditions is greater than a clarity threshold. For example, the one or more edge definition parameters may be adjusted such that the edge definition of the second real-time video enables the observer to distinguish between the objects of the second real-time video.

Figure 5D:
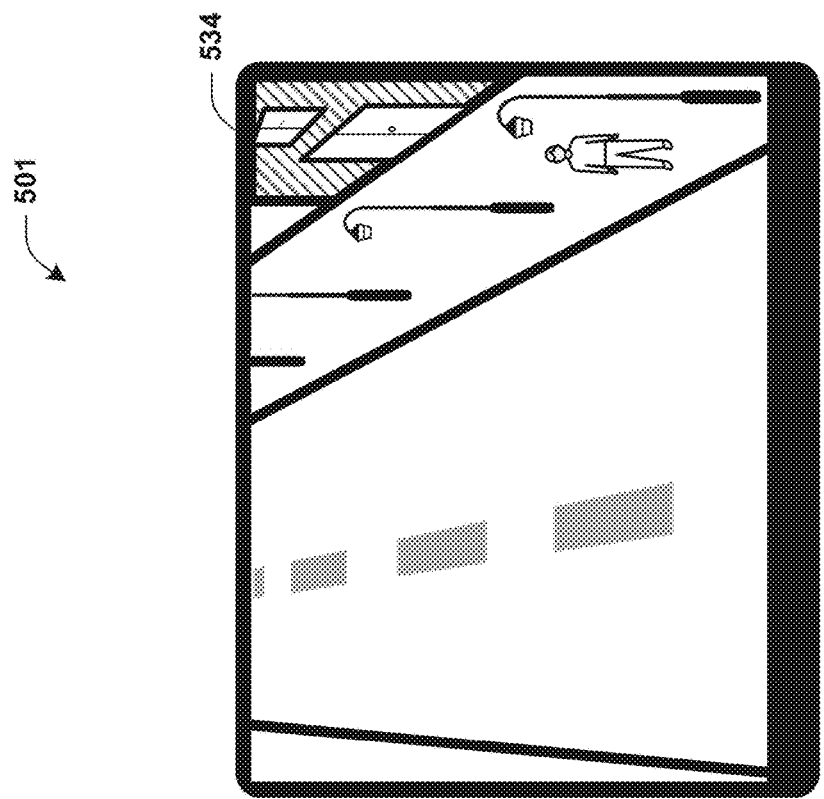
FIG. 5D is a component block diagram illustrating a third instance of a first real-time video and a third instance of a third real-time video associated with an example system for modifying a set of video parameters.
Figure 5D:
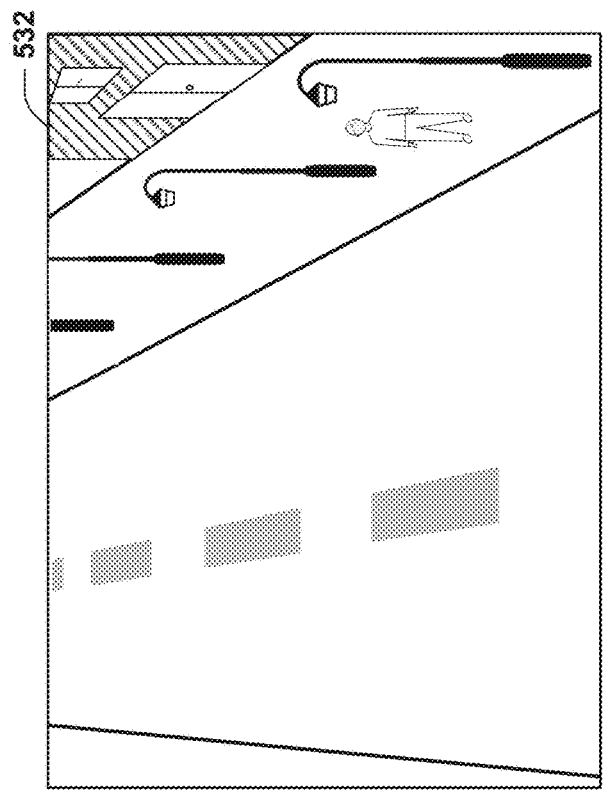

FIG. 5D illustrates a third instance of the first real-time video 532 and/or a third instance of the third real-time video 534. For example, the first real-time video may be processed using the second modified set of video parameters to generate a third instance of the second real-time video. For example, the clarity level of driving conditions of the third instance of the third real-time video 534 (e.g., corresponding to the third instance of the second real-time video) may be greater than the clarity threshold.

In some examples, the first camera may be included in a second set of cameras. For example, the second set of cameras may comprise a third camera. A fourth real-time video may be received from the third camera (e.g., by the server and/or the computing device). In some examples, the fourth real-time video may be continuously transmitted by the third camera (e.g., and/or the communication module and/or a fourth communication module connected to the third camera). For example, the fourth real-time video may comprise a real-time representation of a second view opposing a third side of the obstruction. For example, the third camera may face a direction of the second view and/or the third camera may continuously record the third real-time video.

In some examples, the third side of the obstruction may be the same as the first side of the obstruction. Alternatively and/or additionally, the third side of the obstruction may be different than the first side of the obstruction. Alternatively and/or additionally, the second view may be the same as the first view. Alternatively and/or additionally, the second view may be different than the first view.

In some examples, each camera of the second set of cameras may face a direction different than directions of one or more other cameras of the second set of cameras. For example, the direction that the first camera faces may be different than the direction that the third camera faces. In an example, the direction of the first camera may be at a first angle (e.g., less than 30 degrees, greater than 30 degrees, etc.) relative to the direction of the third camera.

In some examples, the fourth real-time video may be processed using a second set of video parameters to generate a fifth real-time video. For example, the fourth real-time video may be processed using one or more image processing techniques and/or one or more video processing techniques. In some examples, responsive to determining a first set of conditions, transmission of the second real-time video to the display device may be stopped and/or the fifth real-time video may be transmitted to the display device. For example, the fifth real-time video may be continuously displayed on the display area. Alternatively and/or additionally, the fifth real-time video may present second real-time driving conditions corresponding to the second view.

In some examples, the determining the first set of conditions may comprise detecting a change in position of the vehicle from a first position to a second position. For example, the second real-time video may be determined to be relevant to the first position and/or the fifth real-time video may be determined to be relevant to the second position. For example, while the vehicle is within the first position, a line of vision of the driver (e.g., of the vehicle) may be associated with the second real-time video and/or the first view. Alternatively and/or additionally, while the vehicle is within the second position, the line of vision of the driver may be associated with the fifth real-time video and/or the second view. Alternatively and/or additionally, responsive to determining the first set of conditions, a position of the first camera may be adjusted such that the first camera faces a direction of the second view such that the second real-time representation comprises a real-time representation of the second view.

Alternatively and/or additionally, the determining the first set of conditions may comprise detecting that a quality of the fifth real-time video is higher than a quality of the second real-time video. Alternatively and/or additionally, the determining the first set of conditions may comprise detecting that a clarity level of the fifth real-time video is greater than a clarity level of the second real-time video. For example, the first camera may malfunction, become damaged, be covered by one or more objects, etc.

In some examples, the display area may display a plurality of real-time videos corresponding to the second set of cameras. For example, a first portion of the display area may display the second real-time video and/or a second portion of the display device may display the second real-time video may display the fifth real-time video. For example, the display area may comprise a curved surface, a bent surface, a plurality of protrusions, etc. such that merely the first portion of the display area may be seen from a first perspective and the second portion of the display area may be seen from a second perspective. For example, a line of vision of an observer may match the first perspective while the observer is within the first position. Accordingly, merely the first portion (e.g., corresponding to the second real-time video) of the display area may be seen from the first position. Alternatively and/or additionally, a line of vision of the observer may match the second perspective while the observer is within the second position. Accordingly, merely the second portion (e.g., corresponding to the fifth real-time video) of the display area may be seen from the second position.

In some examples, the second camera may face the first portion of the display area from the first perspective, such that merely the first portion of the display area is recorded by the second camera (e.g., such that the third real-time video comprises a real-time representation of the first portion of the display area). Alternatively and/or additionally, a seventh camera, used in modifying the second set of video parameters (e.g., using one or more techniques associated with the second camera), may face the second portion of the display area from the second perspective, such that merely the second portion of the display area is recorded by the seventh camera.

Figure 6A:
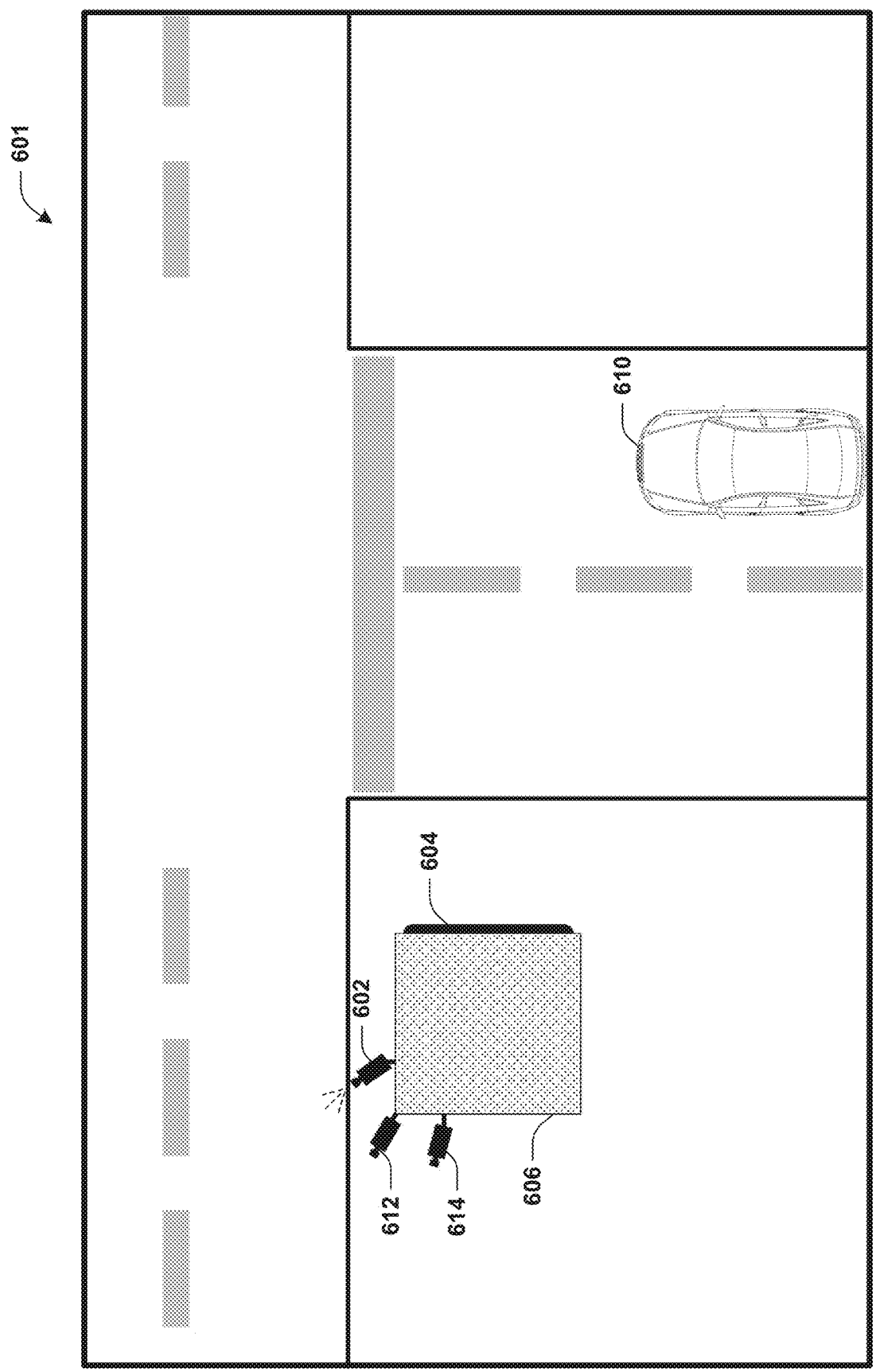
FIG. 6A is a component block diagram illustrating an example system for displaying a plurality of real-time videos corresponding to a second set of cameras, wherein a vehicle is within a first position.
Figure 6B:
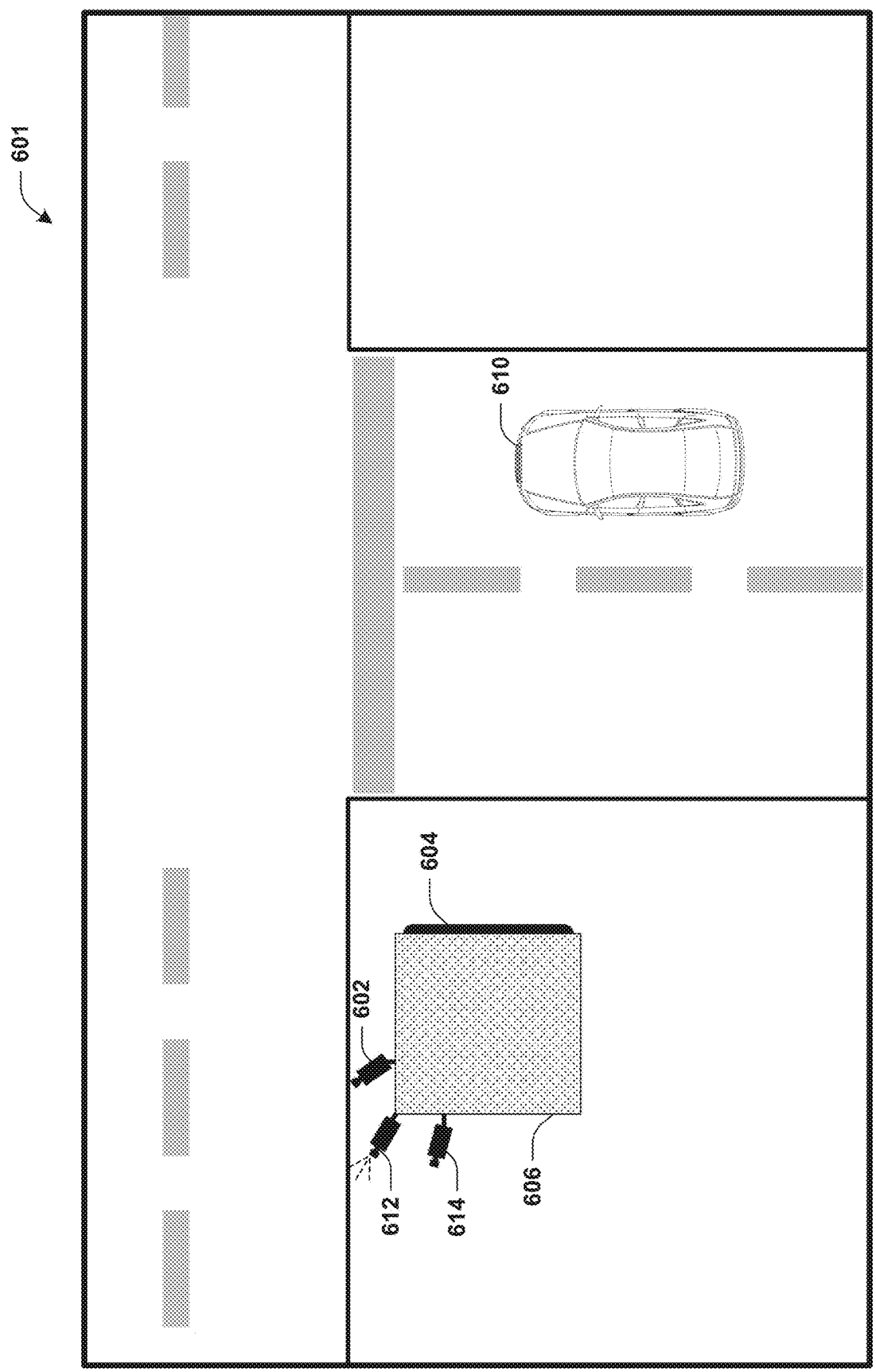
FIG. 6B is a component block diagram illustrating an example system for displaying a plurality of real-time videos corresponding to a second set of cameras, wherein a vehicle is within a second position.
Figure 6C:
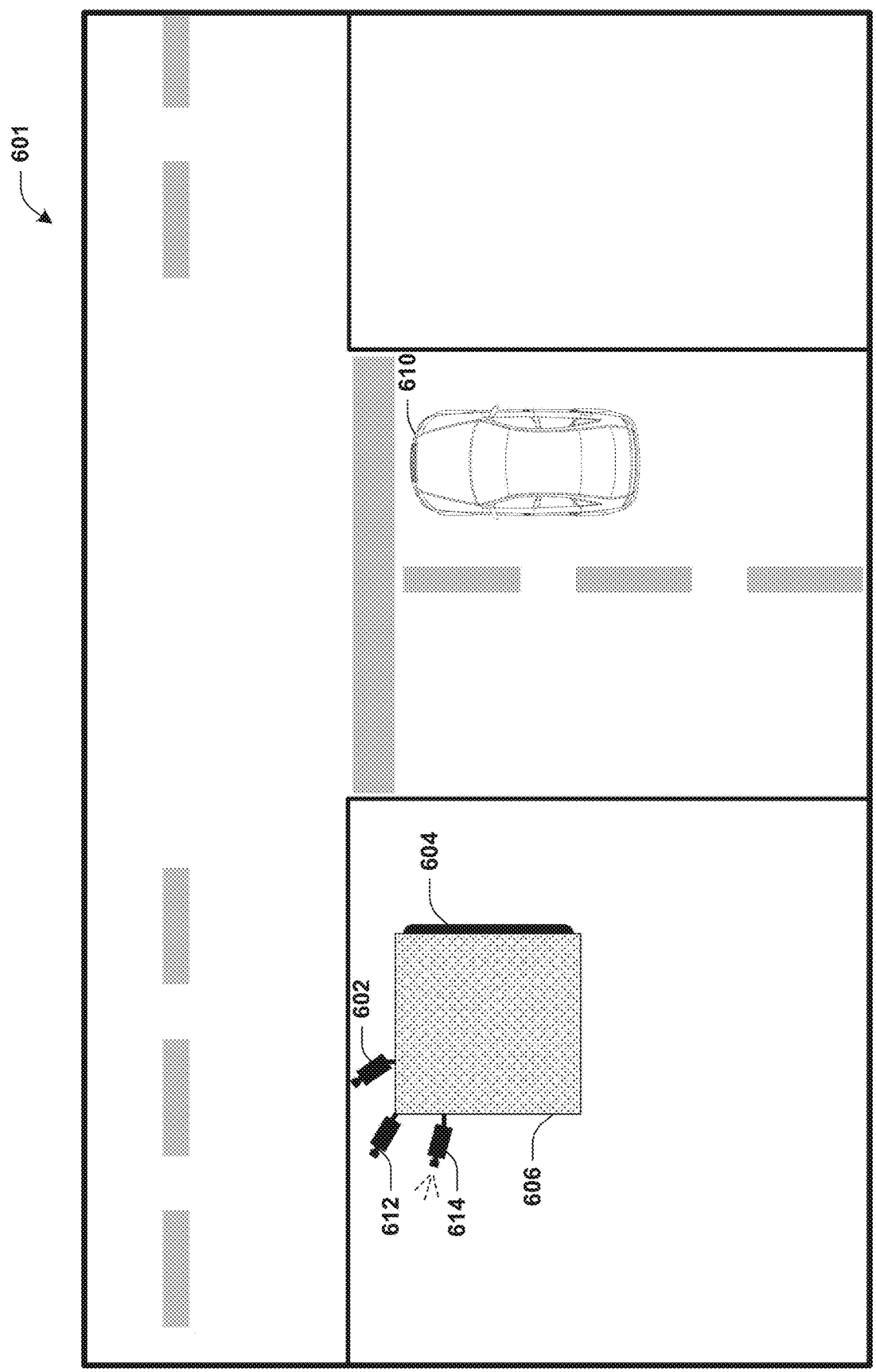
FIG. 6C is a component block diagram illustrating an example system for displaying a plurality of real-time videos corresponding to a second set of cameras, wherein a vehicle is within a third position.

FIGS. 6A-6C illustrates a system 601 for displaying the plurality of real-time videos corresponding to the second set of cameras. For example, the second set of cameras may comprise a fourth camera 614, a fifth camera 612 and/or a sixth camera 602. In some examples, the fourth camera 614 is the first camera and/or the fifth camera 612 is the third camera. The sixth camera 602 may correspond to a sixth real-time video associated with a third view. For example, a direction that the sixth camera 502 faces may be different than a direction of the fourth camera 614 and/or a direction of the fifth camera 612.

FIG. 6A illustrates a vehicle 610 within a first position. In some examples, a third display area 604 may display one or more real-time videos. In some examples, the third display area 604 is the display area. For example, the third display area 604 may be mounted on a third obstruction 606. In some examples, the third obstruction 606 is the obstruction. Alternatively and/or additionally, the third display area 604 may be positioned inside of the vehicle 610. In some examples, it may be determined that the vehicle 610 is within the first position and/or that a line of vision of a driver of the vehicle 610 may be associated with the sixth real-time video and/or the third view. Accordingly, while the vehicle 610 is within the first position, the sixth real-time video may be displayed using the third display area 604.

Alternatively and/or additionally, a first portion of the third display area 604 may display the sixth real-time video, a second portion of the third display area 604 may display the fifth real-time video and/or a third portion of the third display area 604 may display the second real-time video. For example, the third display area 604 may comprise a curved surface, a bent surface, a plurality of protrusions, etc. such that merely the first portion of the third display area 604 (e.g., corresponding to the sixth real-time video) may be seen by the driver of the vehicle 610 while the vehicle 610 is within the first position.

FIG. 6B illustrates the vehicle 610 within a second position. In some examples, it may be determined that the vehicle 610 is within the second position and/or that a line of vision of the driver of the vehicle 610 may be associated with the fifth real-time video and/or the second view. Accordingly, while the vehicle 610 is within the second position, the fifth real-time video may be displayed using the third display area 604. Alternatively and/or additionally, the third display area 604 may comprise the curved surface, the bent surface, the plurality of protrusions, etc. such that merely the second portion of the third display area 604 (e.g., corresponding to the fifth real-time video) may be seen by the driver of the vehicle 610 while the vehicle 610 is within the second position.

FIG. 6C illustrates the vehicle 610 within a third position. In some examples, it may be determined that the vehicle 610 is within the third position and/or that a line of vision of the driver of the vehicle 610 may be associated with the second real-time video and/or the first view. Accordingly, while the vehicle 610 is within the third position, the second real-time video may be displayed using the third display area 604. Alternatively and/or additionally, the third display area 604 may comprise the curved surface, the bent surface, the plurality of protrusions, etc. such that merely the third portion of the third display area 604 (e.g., corresponding to the second real-time video) may be seen by the driver of the vehicle 610 while the vehicle 610 is within the third position.

In some examples, the obstruction may be an object that does not change position (e.g., the obstruction may be immobile). For example, the obstruction may be a support structure such as a column supporting a freeway, a building, a wall, a tree, a mountain, a hill, and/or a different type of obstruction that does not move (e.g., on its own). In an example, the obstruction may be a wall (e.g., of a tunnel, adjacent to a highway, adjacent to train tracks, etc.). For example, the first camera may be positioned on a first side of the wall (e.g., outside of the tunnel) such that the second real-time video comprises a real-time representation of scenery, activity, objects, etc. opposing the first side of the wall. The display area may be positioned on a second side of the wall (e.g., inside of the tunnel) such that the real-time representation of scenery, activity, objects, etc. opposing the first side of the wall may be seen from the second side of the wall (e.g., inside of the tunnel). Alternatively and/or additionally, the display area may be inside of a vehicle (e.g., a car, a train, etc.), such that observers inside of the vehicle may view the real-time representation of scenery, activity, objects, etc. opposing the first side of the wall (e.g., outside of the tunnel).

In a second example, the obstruction may be a mountain (e.g., and/or a hill, a volcano, a valley, etc.). For example, the first camera may be positioned on a first side of the mountain such that the second real-time video comprises a real-time representation of scenery, activity, geographical landmarks, etc. opposing the first side of the mountain. The display area may be positioned on a second side of the mountain such that observers on the second side of the mountain may view the real-time representation of scenery, activity, geographical landmarks, etc. opposing the first side of the mountain. Alternatively and/or additionally, the display area may be inside of an aircraft (e.g., an airplane, a helicopter, etc.) such that a pilot of the aircraft may view the real-time representation of scenery, activity, geographical landmarks, etc. opposing the first side of the mountain.

In some examples, the obstruction may be mobile (e.g., and/or may change positions). For example, the obstruction may be a cloud bank, a vehicle (e.g., a bus, a truck, etc.), a part of a vehicle etc. In an example, the obstruction may be a cloud bank. For example, the first camera may be positioned on a first aircraft (e.g., an unmanned aerial vehicle, an airplane, etc.) that is on a first side of the cloud bank. For example, the second real-time video may comprise a real-time representation of scenery, weather conditions, geographical landmarks, etc. opposing the first side of the cloud bank. Alternatively and/or additionally, the display area may be inside of a second aircraft (e.g., an airplane, a helicopter, etc.) such that a pilot of the second aircraft may view the real-time representation of scenery, weather conditions, geographical landmarks, etc. opposing the first side of the cloud bank.

In a second example, the obstruction may be a vehicle (e.g., a truck, a bus, a van, a car, etc.). For example, the first camera may be positioned on a first side of the vehicle such that the second real-time video comprises a real-time representation of driving conditions, activity, objects, etc. opposing the first side of the vehicle. The display area may be positioned on a second side of the vehicle such that drivers on the second side of the vehicle may view the real-time representation of driving conditions, activity, objects, etc. opposing the first side of the vehicle. Alternatively and/or additionally, the display area may be inside of a second vehicle such that a driver of the second vehicle may view the real-time representation of driving conditions, activity, objects, etc. opposing the first side of the vehicle.

In a third example, the obstruction may be a part of a vehicle. For example, the part of the vehicle may prevent a driver of the vehicle from being able to see a blind spot. In some examples, the part of the vehicle may comprise a pillar of the vehicle (e.g., a structure for supporting a roof panel of the vehicle). For example, the first camera may be positioned on a first side of the part of the vehicle such that the second real-time video comprises a real-time representation of driving conditions, activity, objects, etc. opposing the first side of the part of the vehicle. The display area may be positioned on a second side of the part of the vehicle and/or inside of the vehicle such that a driver of the vehicle may view the real-time representation of driving conditions, activity, objects, etc. opposing the first side of the part of the vehicle.

Figure 7A:
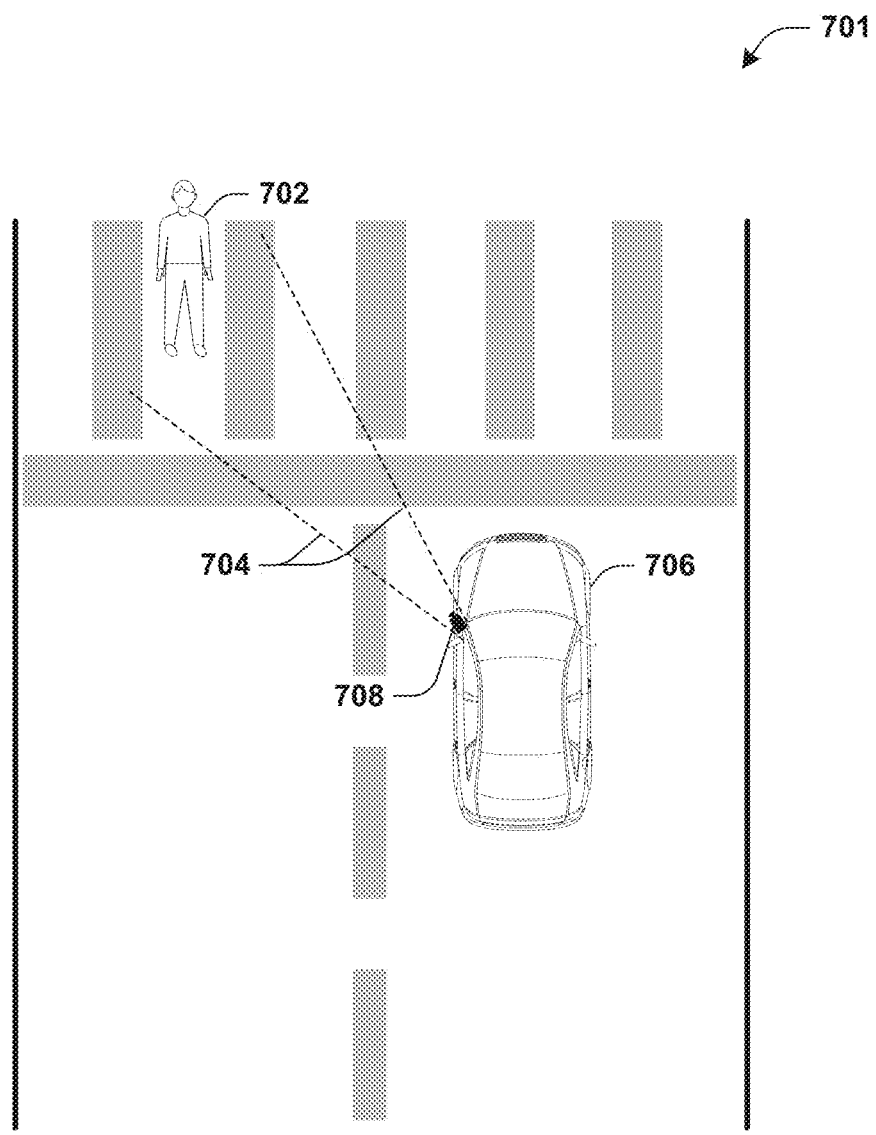
FIG. 7A is a component block diagram illustrating an example system for presenting a real-time representation of an area associated with a blind spot.
Figure 7B:
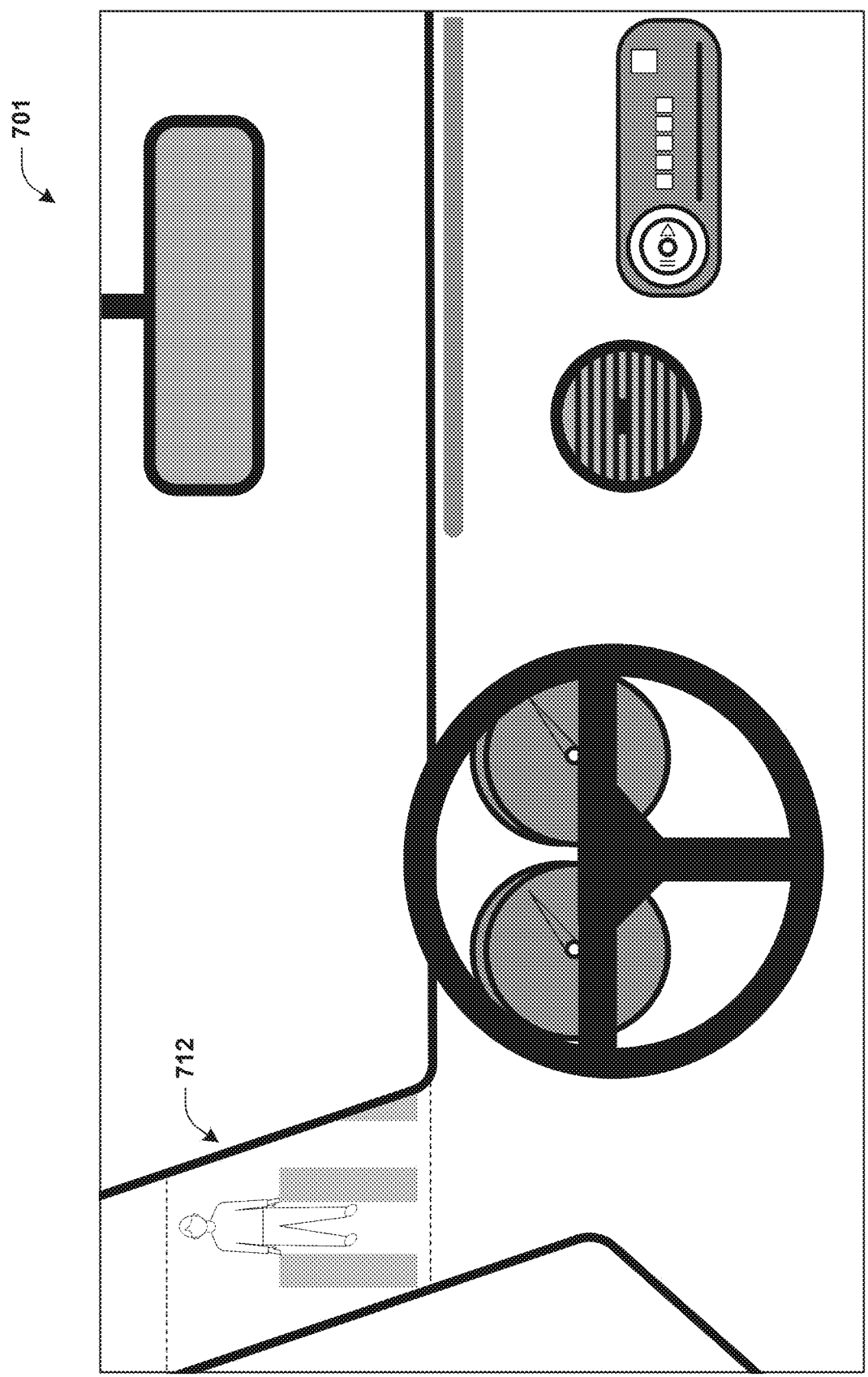
FIG. 7B is a component block diagram illustrating an example system for presenting a real-time representation of an area associated with a blind spot, wherein a second real-time video is displayed by a fourth display area inside of the vehicle.

FIGS. 7A-7B illustrate a system 701 for presenting a real-time representation of an area associated with a blind spot. FIG. 7A illustrates a blind spot 704. For example, a pillar of a vehicle 706 may prevent a driver of the vehicle 706 from being able to see the blind spot 704. In some examples, an eighth camera 708 may be positioned on a first side of the pillar of the vehicle 706 (e.g., and/or a different part of the vehicle 706) such that the second real-time video comprises a real-time representation of driving conditions, activity such as a pedestrian 702 crossing an intersection, objects such as the pedestrian 702, etc. within the blind spot 704. FIG. 7B illustrates a fourth display area 712 displaying the second real-time video inside of the vehicle 706. For example, the fourth display area 712 may be positioned on a second side of the pillar of the vehicle 706, such that the driver of the vehicle 706 may view the real-time representation of driving conditions, activity, objects such as the pedestrian 702, etc. within the blind spot.

It may be appreciated that the disclosed subject matter may assist an observer, a driver, and/or an autonomous vehicle in viewing, understanding and/or determining a significance of driving conditions, activity, objects, scenery, geographical landmarks, weather conditions, etc. within views that are obstructed.

Implementation of at least some of the disclosed subject matter may lead to benefits including, but not limited to, increased safety and decreased risk of car accidents and/or other types of accidents (e.g., as a result of displaying the second real-time video on a first side of the obstruction and/or within a vehicle, as a result of receiving the third real-time video and modifying the set of video parameters to increase a closeness level between the second real-time video and the first real-time video, as a result of modifying the set of video parameters to increase a clarity level of the second real-time video such that the observer, the driver and/or the autonomous vehicle may view, understand and/or determine a significance of objects such as vehicles, pedestrians and/or other types of objects, etc.).

Alternatively and/or additionally, implementation of at least some of the disclosed subject matter may lead to benefits including an improved quality and/or accuracy of the second real-time video (e.g., as a result of controlling the graphical user interface to display the video rating interface, as a result of receiving the one or more inputs using the video rating interface, as a result of modifying the set of video parameters based upon the one or more inputs, as a result of modifying the set of video parameters to increase the clarity-level of the second real-time video, as a result of modifying the set of parameters to increase the closeness level between the second real-time video and the first real-time video, etc.).

Alternatively and/or additionally, implementation of at least some of the disclosed subject matter may lead to benefits including an improved usability of a display (e.g., as a result of modifying the set of video parameters based upon the display device and/or characteristics of the display area, as a result of the display area being positioned adjacent to a windshield, a window, a dashboard, a steering wheel, etc. of a vehicle, as a result of the display area comprising an HUD, as a result of the second real-time video being projected onto the display area by the projector, as a result of the second real-time video being projected onto the windshield, the window, the dashboard, the steering wheel, a pillar, etc. of the vehicle, etc.).

In some examples, at least some of the disclosed subject matter may be implemented on a computing device, and in some examples, at least some of the disclosed subject matter may be implemented on a server (e.g., hosting a service accessible via a network, such as the Internet).

Figure 8:
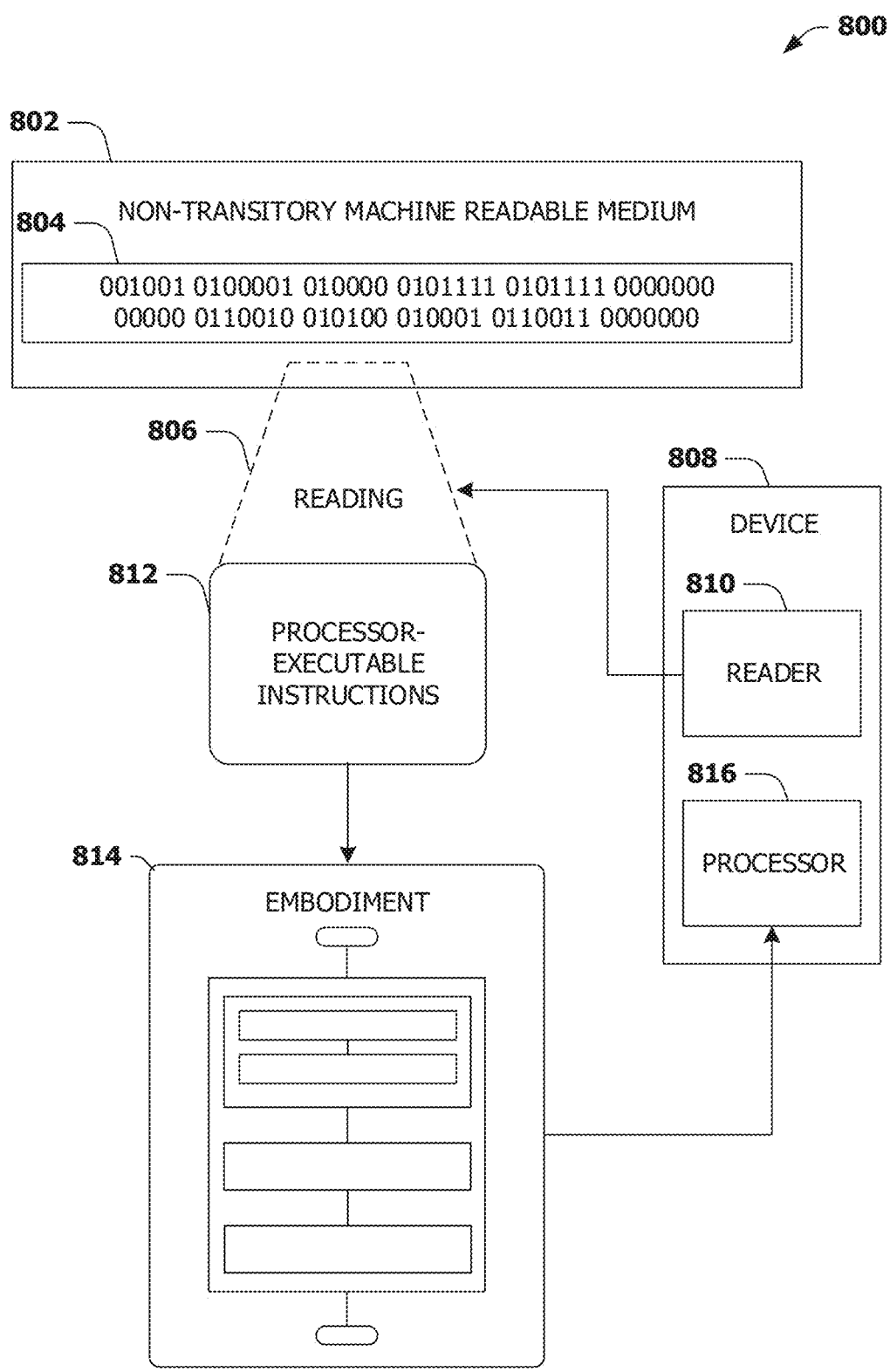
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4, for example. In some embodiments, the processor-executable instructions 812 are configured to cause implementation of a system, such as at least some of the example system 501 of FIGS. 5A-5D, the example system 601 of FIGS. 6A-6C and/or the example system 701 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    receiving a first real-time video from a first camera, wherein the first real-time video comprises a real-time representation of a view opposing a first side of an obstruction;
    processing the first real-time video to generate a second real-time video;
    transmitting the second real-time video, generated based upon the first real-time video from the first camera, to a display device, wherein the second real-time video is displayed, using the display device, on a second side of the obstruction, wherein the second real-time video presents real-time driving conditions corresponding to the view opposing the first side of the obstruction;
    receiving a third real-time video from a second camera, wherein the third real-time video comprises a real-time representation of a second view opposing a third side of the obstruction;
    processing the third real-time video to generate a fourth real-time video, wherein the fourth real-time video is different than the second real-time video; and
    responsive to determining a first set of conditions:
        transmitting the fourth real-time video, generated based upon the third real-time video from the second camera, to the display device, wherein the fourth real-time video presents second real-time driving conditions corresponding to the second view opposing the third side of the obstruction.

2. The method of claim 1, comprising:
    controlling a graphical user interface of a first device to display a video rating interface.

3. The method of claim 2, comprising:
    displaying, using the video rating interface, a representation of a segment of the second real-time video.

4. The method of claim 3, comprising:
    displaying, using the video rating interface, one or more selectable inputs.

5. The method of claim 4, comprising:
    receiving one or more selections of the one or more selectable inputs.

6. The method of claim 5, comprising:
    determining a rating of the segment based upon the one or more selections of the one or more selectable inputs.

7. The method of claim 6, wherein the generating the fourth real-time video is performed based upon the rating of the segment.

8. The method of claim 2, wherein:
    the first device is the display device.

9. The method of claim 8, wherein:
    the video rating interface is displayed using a display area.

10. A non-transitory machine readable medium having stored thereon processor-executable instructions that when executed cause performance of operations, the operations comprising:
    receiving a first real-time video from a first camera, wherein the first real-time video comprises a real-time representation of a view opposing a first side of an obstruction;
    receiving a third real-time video from a first device, wherein the third real-time video comprises a real-time representation of content displayed using a display device;

generating a modified set of video parameters based upon a comparison of (i) the third real-time video received from the first device with (ii) the first real-time video received from the first camera; and processing the first real-time video using the modified set of video parameters to generate a second real-time video.

11. The non-transitory machine readable medium of claim 10, wherein:
the first device comprises a second camera facing a display area.

12. The non-transitory machine readable medium of claim 11, wherein:
the display area is associated with the display device.

13. The non-transitory machine readable medium of claim 12, wherein:
the third real-time video is recorded by the second camera.

14. The non-transitory machine readable medium of claim 10, wherein the generating a modified set of video parameters comprises modifying a set of video parameters a plurality of instances.

15. The non-transitory machine readable medium of claim 10, wherein the generating a modified set of video parameters comprises modifying a set of video parameters a plurality of instances until a level of closeness between one or more parameters of the third real-time video and one or more parameters of the first real-time video is greater than a closeness threshold.

16. A computing device, comprising:
a processor; and
memory comprising processor-executable instructions that when executed by the processor cause performance of operations, the operations comprising:
receiving a first real-time video from a first camera, wherein the first real-time video comprises a real-time representation of a view opposing a first side of a pillar of a vehicle, wherein the first side of the pillar is on an outside of the vehicle, wherein the pillar prevents a user of the vehicle from seeing a blind spot corresponding to the view opposing the first side of the pillar;
receiving one or more indications of heat, emanated by one or more objects associated with the first real-time video, from one or more sensors;
processing the first real-time video to generate a second real-time video, wherein the second real-time video comprises representations of the heat emanated by the one or more objects; and
displaying, while the first side of the pillar opposing the view is on the outside of the vehicle, the second real-time video via a display area, the display area positioned on a second side of the same pillar of the vehicle, wherein the second side of the same pillar is inside the vehicle, wherein the display area enables the user of the vehicle to see a real-time representation of the blind spot, wherein the real-time representation of the blind spot is indicative of at least one of one or more driving conditions, one or more activities or the one or more objects.

17. The computing device of claim 16, wherein the real-time representation of the blind spot is indicative of the one or more driving conditions.

18. The computing device of claim 16, wherein the real-time representation of the blind spot is indicative of the one or more activities.

19. The computing device of claim 16, wherein the real-time representation of the blind spot is indicative of the one or more objects.

20. The computing device of claim 16, wherein the user of the vehicle is a driver of the vehicle.

* * * * *